(12) United States Patent
Kawasaki et al.

(10) Patent No.: US 8,072,710 B2
(45) Date of Patent: Dec. 6, 2011

(54) THIN-FILM MAGNETIC HEAD THAT LOCALLY PROJECTS AN ELEMENT PART TOWARD A RECORDING MEDIUM BY THERMAL EXPANSION

(75) Inventors: Mitsuo Kawasaki, Tokyo (JP); Kiyoshi Kobayashi, Tokyo (JP); Tomoo Otsuka, Tokyo (JP); Hironori Namba, Tokyo (JP); Yusuke Kanekuni, Tokyo (JP)

(73) Assignee: TDK Corporation, Tokyo (JP)

( * ) Notice: Subject to any disclaimer, the term of this patent is extended or adjusted under 35 U.S.C. 154(b) by 883 days.

(21) Appl. No.: 12/105,057

(22) Filed: Apr. 17, 2008

(65) Prior Publication Data

US 2008/0266722 A1    Oct. 30, 2008

(30) Foreign Application Priority Data

Apr. 24, 2007 (JP) .................. 2007-114524

(51) Int. Cl.
*G11B 5/33* (2006.01)
(52) U.S. Cl. ...................................... 360/319
(58) Field of Classification Search .......... None
See application file for complete search history.

(56) References Cited

U.S. PATENT DOCUMENTS

| 7,061,726 B2 | 6/2006 | Ohtomo et al. |
| 7,542,246 B1 * | 6/2009 | Song et al. .................. 360/319 |
| 2007/0211381 A1 | 9/2007 | Kobayashi et al. |
| 2007/0297097 A1 * | 12/2007 | Watanabe et al. ............ 360/319 |

FOREIGN PATENT DOCUMENTS

| JP | A 2004-334995 | 11/2004 |
| JP | A 2006-66261 | 3/2006 |
| JP | A-2007-242189 | 9/2007 |

* cited by examiner

*Primary Examiner* — David D Davis
(74) *Attorney, Agent, or Firm* — Oliff & Berridge, PLC

(57) ABSTRACT

A thin-film magnetic head comprises a reproducing element formed on an undercoat film on a head substrate surface, a recording element formed on the upper side of the reproducing element, and a heater formed on the upper or lower side of the reproducing element, the heater generating heat upon energization so as to project at least the reproducing element by thermal expansion toward a recording medium. A shield layer is formed between the reproducing element and the heater by a plurality of layers including at least first and second shield layers. In the first and second shield layers, the second upper shield layer located closer to the heater is formed by a material having a coefficient of thermal expansion smaller than that of the first shield layer located closer to the reproducing element.

3 Claims, 5 Drawing Sheets

THIN-FILM MAGNETIC HEAD THAT LOCALLY PROJECTS AN ELEMENT PART TOWARD A RECORDING MEDIUM BY THERMAL EXPANSION

BACKGROUND OF THE INVENTION

1. Field of the Invention

The present invention relates to a thin-film magnetic head which locally projects an element part toward a recording medium by thermal expansion, so as to control the amount of floating.

2. Related Background Art

A thin-film magnetic head comprises a reproducing element which reads magnetic information from a recording medium by utilizing a magnetoresistive effect and a recording element, laminated on the reproducing element, for applying a recording magnetic field to the recording medium and thereby recording magnetic information thereon. As is well known, the reproducing element is formed between lower and upper shield layers by way of a gap layer, while the recording element in a perpendicular recording system, for example, is constituted by a main magnetic pole layer and a return yoke layer which are exposed at a surface opposing a recording medium while holding a magnetic gap layer therebetween, a recording coil which supplies a recording magnetic field to the main magnetic pole layer, and the like. Recently proposed are those in which a heater generating heat upon energization is provided near the reproducing and recording element s, so as to project an element part toward the recording medium by thermal expansion and locally narrow the gap between the recording medium and the reproducing and recording elements, thereby improving reproducing and recording performances. In such a conventional thin-film magnetic head, the amount of floating of the recording and reproducing elements from the recording medium greatly affects reading and writing capabilities, whereby it has been becoming important to control the amount of projection of the recording and reproducing parts. It has been proposed to hold a material having a small coefficient of thermal expansion within an element part of the thin-film magnetic head in order to control the amount of projection of the element part (Japanese Patent Application Laid-Open No. 2004-334995).

SUMMARY OF THE INVENTION

The applicant has proposed an arrangement in which a heater is provided such as to overlap a shield layer two-dimensionally in order for a reproducing element to project as much as possible in a thin-film magnetic head in Japanese Patent Application No. 2006-066261. Though it increases the amount of projection of the reproducing element, the heater two-dimensionally overlapping the shield layer most intensively heats the shield layer located closer thereto than the reproducing element, whereby the shield layer may project more than the reproducing element. For example, since the thin-film magnetic head described in Patent Document 1 is constructed such that the reproducing element is held by a shield layer having a smaller coefficient of thermal expansion whose exterior is further held by a shield layer having a greater coefficient of thermal expansion, the shield layer having a greater coefficient of thermal expansion will project more if the arrangement of the heater provided such as to overlap the shield layer two-dimensionally as proposed by the applicant is employed in the thin-film magnetic head described in Japanese Patent Application Laid-Open No. 2004-334995.

In view of the problem mentioned above, it is an object of the present invention to provide a thin-film magnetic head in which a peak of the amount of projection to a recording medium is made closer to a reproducing element by thermal expansion due to the heat of a heater.

The thin-film magnetic head achieving the above-mentioned object comprises a reproducing element formed on an undercoat film on a head substrate surface, a recording element formed on the upper side of the reproducing element, and a heater formed on the upper or lower side of the reproducing element, the heater generating heat upon energization so as to project at least the reproducing element by thermal expansion toward a recording medium; wherein a shield layer is formed between the reproducing element and the heater by a plurality of layers including at least first and second shield layers; and wherein, in the first and second shield layers, the second shield layer located closer to the heater is formed by a material having a coefficient of thermal expansion smaller than that of the first shield layer located closer to the reproducing element.

It will be practical if the first shield layer is formed by Fe—Ni containing about 19 wt % of Fe, while the second shield layer is formed by Fe—Ni containing about 58 wt % of Fe.

The thin-film magnetic head in accordance with the present invention may be constructed such that the recording element has a main magnetic pole layer and a return yoke layer which are exposed at a surface opposing the recording medium while holding a magnetic gap layer therebetween, the return yoke layer being formed by a material having a coefficient of thermal expansion smaller than that of the first shield layer. Preferably, in this case, the second shield layer has a thickness of about 25% to about 75% that of the shield layer.

The present invention can make a peak of the amount of projection to the recording medium closer to the reproducing element by thermal expansion due to the heat of the heater, and thus can reduce the amount of floating, thereby improving the reproducing characteristic.

DESCRIPTION OF THE PREFERRED EMBODIMENTS

Figure 1:
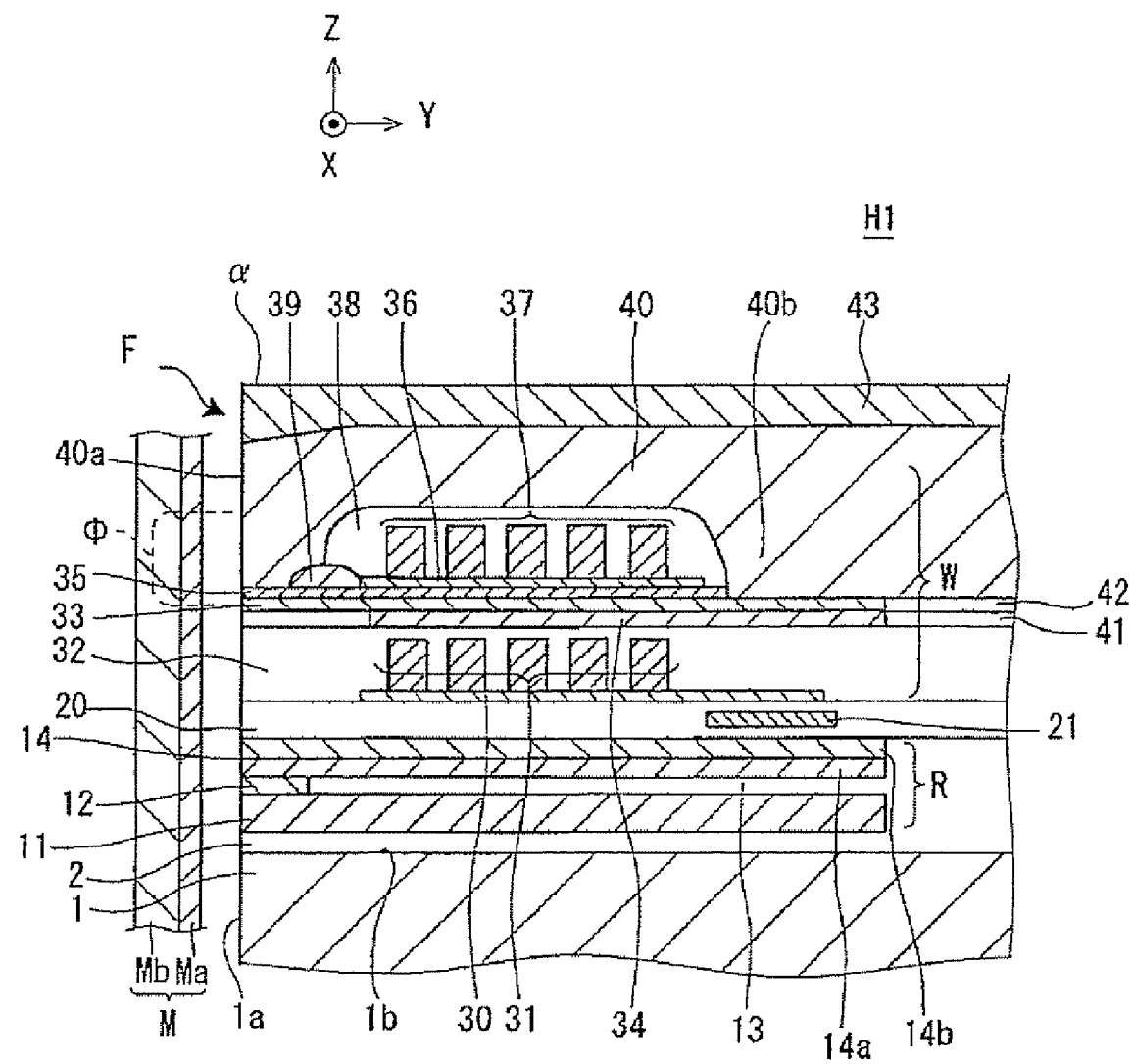
FIG. 1 is a sectional view showing the structure of the thin-film magnetic head in accordance with an embodiment of the present invention cut at the element center and corresponding to a cross section taken along the line I-I of FIG. 2.

In the following, the present invention will be explained with reference to the drawings. In the drawings, X, Y, and Z directions are defined by the track width direction, the height direction, and the laminating direction of layers constituting a thin-film magnetic head or the moving direction of a recording medium, respectively.

Figure 2:
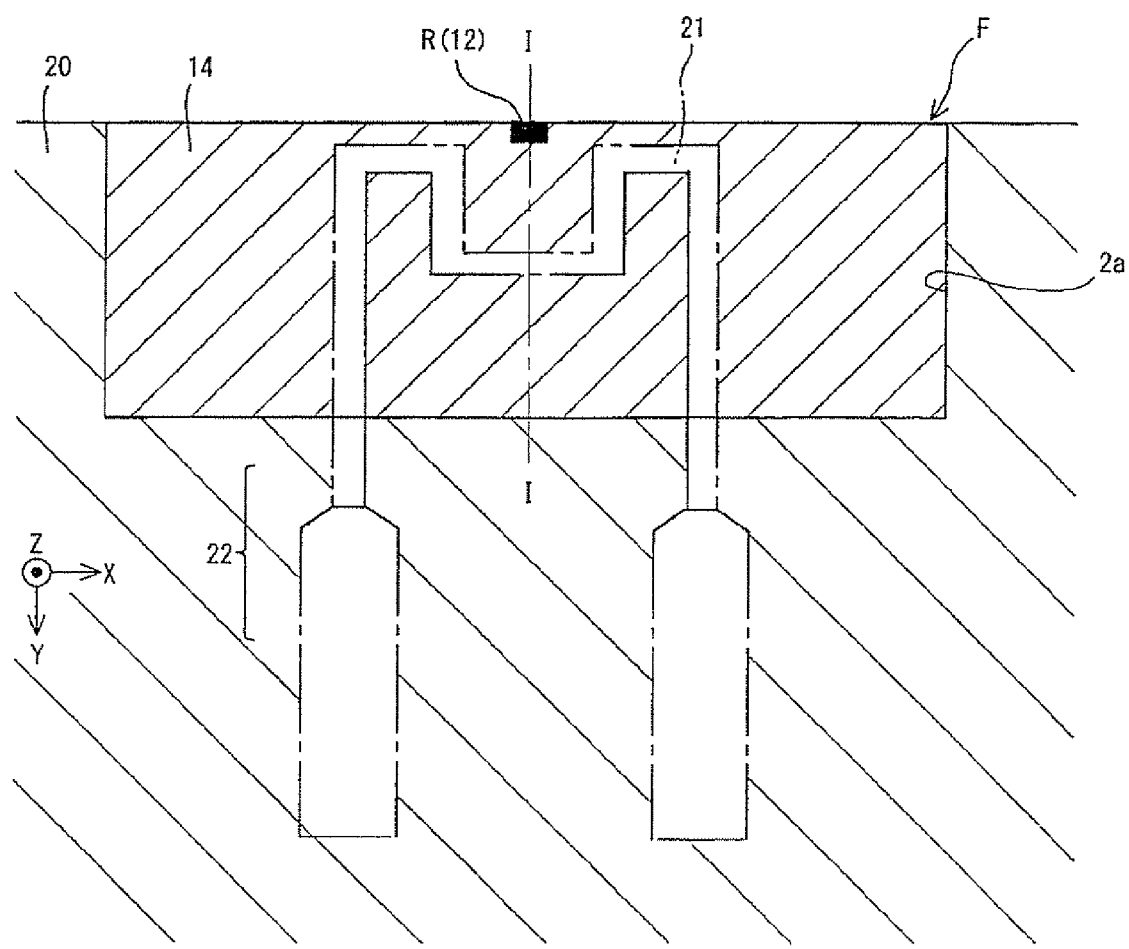
FIG. 2 is a plan view of the heater and reproducing element part of the thin-film magnetic head of the present invention.

FIG. 1 is a vertical sectional view showing the structure of a thin-film magnetic head H1 in accordance with a first embodiment cut at the element center. FIG. 2 is a planar view showing an overlap between a heater and a shield when the thin-film magnetic head of FIG. 1 is seen two-dimensionally. The thin-film magnetic head H1 is a perpendicular magnetic head having a reproducing part R and a recording part W which are formed by laminating thin films on a slider (head substrate) 1. The reproducing part R reads magnetic information from a recording medium M by utilizing a magnetoresistive effect, while the recording part W supplies a perpendicular recording magnetic field to the recording medium M, so as to magnetize a hard magnetic film Ma of the recording medium M perpendicularly for a recording action.

The recording medium M has the hard magnetic film Ma with a higher remanent magnetization on the medium surface side and a soft magnetic film Mb with a higher magnetic permeability on the inner side of the hard magnetic film Ma. The recording medium M is a circular disk, for example, and is rotated about the center of the circle as a rotary axis by a spindle motor. The slider 1 is formed by $Al_2O_3$.TiC. One end face 1a of the slider 1 opposes the recording medium M. As the recording medium M rotates, a surface airflow levitates the slider 1 from the surface of the recording medium M.

An undercoat film 2 made of $Al_2O_3$ is formed on a trailing-side end face 1b of the slider 1, while the reproducing part R is laminated on the undercoat film 2. The reproducing part R has a lower shield layer 11, an upper shield layer 14, a gap insulating layer 14 filling the gap between the lower shield layer 11 and upper shield layer 14, and a reproducing element 12 positioned within the gap insulating layer 13. The reproducing element 12 is a magnetoresistive element such as AMR, GMR, or TMR.

The recording part W is laminated on the upper shield layer 14 while interposing a separation layer 20 therebetween. The recording part W has a main magnetic pole layer 33 and a return yoke layer 40 which are made of a ferromagnetic material having a high saturated magnetic flux density such as Ni—Fe, Co—Fe, or Ni—Fe—Co; a magnetic gap layer 35 made of a nonmagnetic material such as $Al_2O_3$, $SiO_2$, Au, or Ru interposed between the main magnetic pole layer 33 and return yoke layer 40 at a surface (medium-opposing surface) F opposing the recording medium M; coil layers (31, 37) supplying a recording magnetic field to the main magnetic pole layer 33; an auxiliary yoke layer 34 formed directly under the main magnetic pole layer 33 by a magnetic material having a saturated magnetic flux density lower than that of the main magnetic pole layer 33; and a height determining layer 39 formed on the magnetic gap layer 35 such as to retract from the medium-opposing surface F by a predetermined distance.

The size in the depicted X direction of the leading end face of the main magnetic pole layer 33 exposed at the medium-opposing surface F is defined by the writing track width. The return yoke layer 40 opposes the main magnetic pole layer 33 with a predetermined distance (gap distance) at the leading end face 40a exposed at the medium-opposing surface F, and connects with the main magnetic pole layer 33 at a connecting part 40b positioned deeper than the leading end face 40a in the height direction. The return yoke layer 40 is formed greater than the main magnetic pole layer 33 in the track width and height directions. An insulating layer 41 made of $Al_2O_3$, $SiO_2$, or Al—Si—O, for example, is formed about the main magnetic pole layer 33 and auxiliary yoke layer 34.

The lower coil layer 31 laminated on the upper shield layer 14 while interposing the separation layer 20 (a coil insulating foundation layer 30) therebetween and the upper coil layer 37 laminated on the magnetic gap layer 35 while interposing a coil insulating foundation layer 36 therebetween are formed by a plurality of rows of coil lines, each extending in the track width direction, arranged in the height direction. End parts of the coil lines are connected to each other, so as to form a solenoid coil wound about the main magnetic pole layer 33 and auxiliary yoke layer 34 on the upper and lower sides of these layers. The coil lines of the lower and upper coil layers 31, 37 are formed by at least one nonmagnetic metal material selected from Au, Cu, Al, Pt, Ag, W, Ni, NiP, Rh, Fe, Co, Cr, Ta, and Ti, and are covered with coil insulating layers 32, 38 made of an organic insulating material such as resist. The upper faces of the coil insulating layers 32, 38 are made flat, while the main magnetic pole layer 33 and return yoke layer 40 are formed on these flat surfaces, respectively. A protecting layer 43 made of $Al_2O_3$ is formed on the return yoke layer 40.

A heater 21 generating heat upon energization is provided within the separation layer 20 interposed between the reproducing part R and recording part W. For example, the heater 21 has a heating area having an M-shaped two-dimensional form which actually generates heat and a pair of lead electrodes 22 extending to the deeper side in the height direction from both track-width ends of the heating area (see FIG. 2). The heating area may have any pattern form such as meander form. The heater 21 is formed by sputtering with NiFe, CuNi, or CuMn, for example.

The heat generated from the heater 21 is transferred toward the medium-opposing surface F, toward the reproducing element 12 from the upper shield layer 14, and toward the main magnetic pole layer 33 from the coil insulating layer 32, so as to locally project the element part (the reproducing element 12 of the reproducing part R and the main magnetic pole layer 33 of the recording part W) toward the recording medium M by thermal expansion. As the amount of heat transferred from the heater 21 to the element part becomes greater, the amount of projection of the element part increases, thus reducing the gap between the element part and the recording medium M, thereby improving the recording and reproducing characteristics.

In the first embodiment of the present invention, the upper shield layer 14 has a two-layer structure made of first and second upper shield layers 14a, 14b, while the second upper shield layer 14b located closer to the heater 21 is formed by a material having a coefficient of thermal expansion lower than that of the first upper shield layer 14a. Fe—Ni is used in the upper shield layer 14. In this embodiment, Fe—Ni containing about 19 wt % of Fe and having a high coefficient of thermal expansion is used in the first upper shield layer 14a, while Fe—Ni containing about 58 wt % of Fe and having a low coefficient of thermal expansion is used in the second upper shield layer 14b. In the thin-film magnetic head H, the thickness of the upper shield layer 14 is 1.6 μm.

The lower shield layer 11 is made of the same material as that of the first upper shield layer 14a, i.e., Fe—Ni containing about 19 wt % of Fe.

The return yoke layer 40 is made of the same material as that of the first upper shield layer 14a, i.e., Fe—Ni containing about 19 wt % of Fe.

Figure 3:
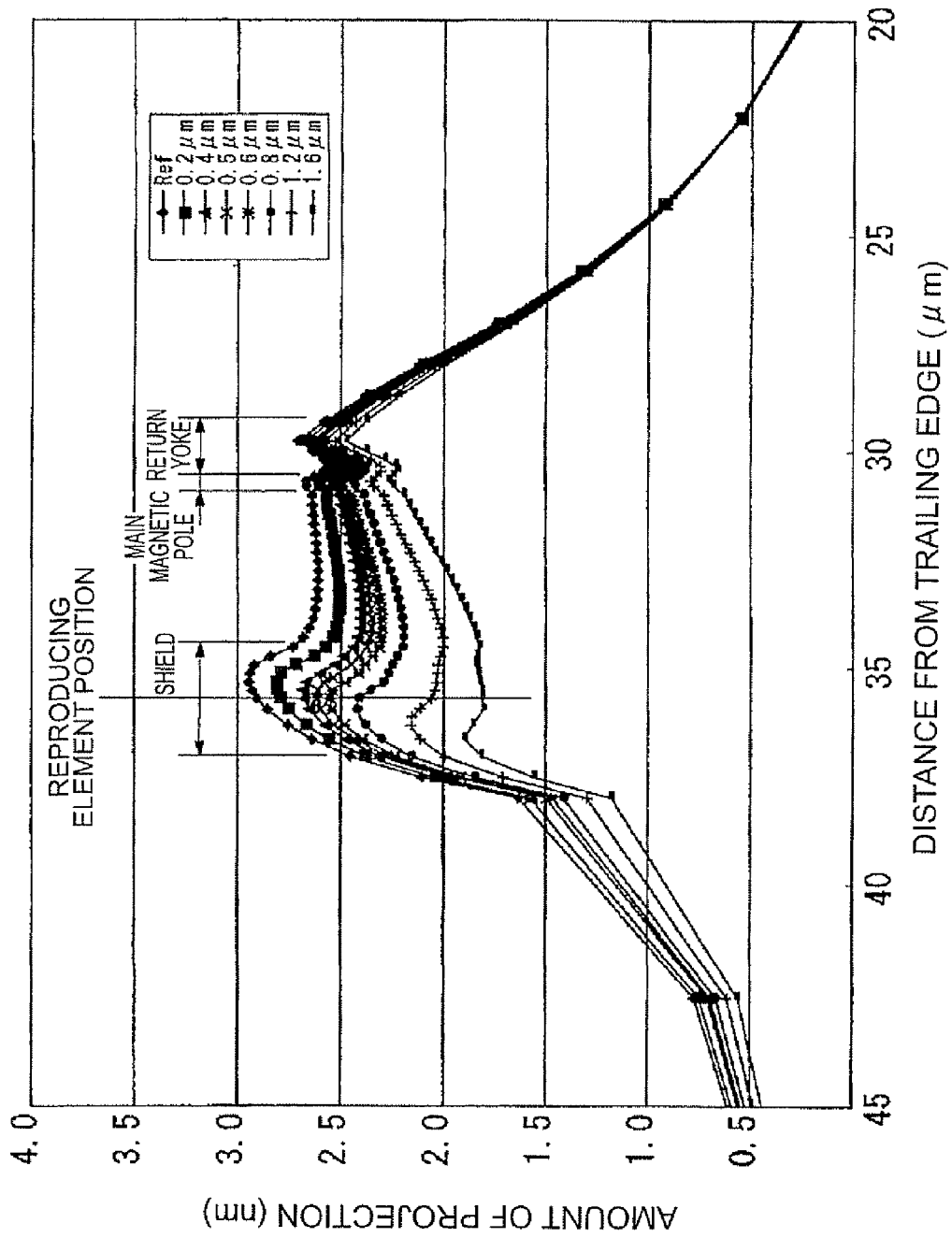
FIG. 3 is a graph showing results of simulations of changes in the amount of projection of the element part (medium-opposing surface) in the thin-film magnetic head while changing the ratio in thickness of the second upper shield layer in the upper shield layer in the first embodiment of the present invention.

As a graph, FIG. 3 shows results of simulations of changes in the amount of projection of the element part (medium-opposing surface F) with temperature when changing the ratio in thickness of the first and second upper shield layers 14a, 14b while fixing the total thickness of the upper shield layer 14 to 1.6 μm in the first embodiment. The change in ambient temperature is from 25° C. to 60° C. Here, results of the simulation in the case where the thickness of the second upper shield layer 14b is 0, i.e., the case where the upper shield layer 14 consists of the first upper shield layer 14a alone, are plotted as a comparative example Ref, while results of simulations in the respective cases where the thickness of the second upper shield layer 14b is 0.2 μm, 0.4 μm, 0.5 μm, 0.6 μm, 0.8 μm, 1.2 μm, and 1.6 μm are plotted. Here, the comparative example Ref is equivalent to a conventional thin-film magnetic head in which the upper shield layer 14 has a one-layer structure.

In the graph of FIG. 3, the abscissa is the distance [μm] from the upper face position of the protecting layer 43, i.e., trailing edge α, in FIG. 1, while the ordinate is the amount of projection [α] of the medium-opposing surface F of the thin-film magnetic head. The distance from the trailing edge is represented while taking the trailing edge as reference position 0. The distance of about 35 to 37 μm refers to the vicinity of the reproducing element 12. The distance of about 31 μm refers to the vicinity of the main magnetic pole layer 33. The distance of about 29 to 31 μm refers to the return yoke layer 40. The amount of projection is a value simulated while one end face 1a of the slider 1 opposing the recording medium M is taken as reference surface 0 at an ambient temperature of 25° C. when the heater is not energized.

The above-mentioned graph shows it possible to project the vicinity of the reproducing element 12 more when the thickness of the second upper shield layer 14b is 0.4 to 1.2 μm (25% to 75% of the thickness of the upper shield layer 14) than in the single compositions of Ref (0 μm) and 1.6 μm. The reproducing element 12 can more preferably be projected to the maximum when the thickness of the second upper shield layer 14b is 0.8 μm (about 50% of the thickness of the upper shield layer 14).

The foregoing results of simulations show that, by setting the thickness of the second upper shield layer 14b near the heater 21 to about 0.4 to 1.2 μm, i.e., about 25% to about 75% of the thickness of the upper shield layer 14, the thin-film magnetic head of the first embodiment projects the reproducing element 12 more than the upper and lower shields, thereby improving the recording and reproducing characteristics, and can keep the improved recording and reproducing characteristics regardless of changes in temperature.

In the first embodiment, the return yoke layer 40 is formed by Fe—Ni containing about 19 wt % of Fe. A second embodiment in which the return yoke layer 40 is formed by a material having a small coefficient of thermal expansion as with the second upper shield layer 14b will now be explained. In the second embodiment, the return yoke layer 40 is formed by Fe—Ni containing about 58 wt % of Fe as with the second upper shield layer 14b. The second embodiment is the same as the first embodiment except for the material of the return yoke layer 40.

Figure 4:
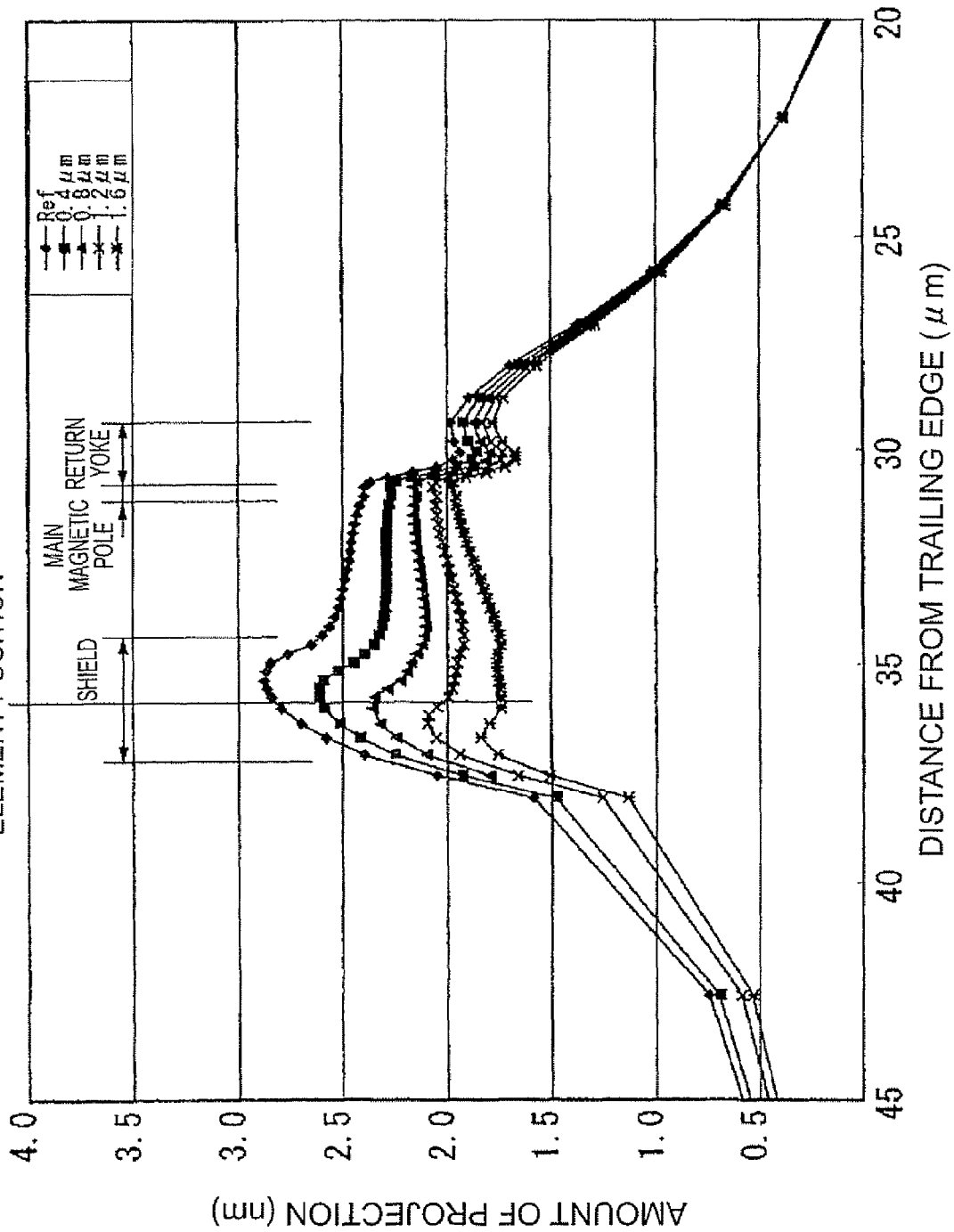
FIG. 4 is a graph showing results of simulations of changes in the amount of projection of the element part (medium-opposing surface) in the thin-film magnetic head while changing the ratio in thickness of the second upper shield layer in the upper shield layer in the second embodiment of the present invention.

Results of simulations in the thin-film magnetic head of the second embodiment performed as in the first embodiment will now be explained. As a graph, FIG. 4 shows results of simulations of changes in the amount of projection of the medium-opposing surface F (element part) with temperature when changing the ratio in thickness of the first and second upper shield layers 14a, 14b while fixing the total thickness of the upper shield layer 14 to 1.6 μm in the second embodiment. The change in ambient temperature is from 25° C. to 60° C. Here, results of the simulation in the case where the thickness of the second upper shield layer 14b is 0, i.e., the case where the upper shield layer 14 consists of the first upper shield layer 14a alone, are plotted as a comparative example Ref, while results of simulations in the respective cases where the thickness of the second upper shield layer 14b is 0.4 μm, 0.8 μm, 1.2 μm, and 1.6 μm are plotted.

In the graph of FIG. 4, the abscissa is the distance [μm] from the upper face position of the protecting layer 43, i.e., the trailing edge α, in FIG. 1, while the ordinate is the amount of projection [nm] of the medium-opposing surface F of the thin-film magnetic head. The distance from the trailing edge is represented while taking the trailing edge as reference position 0. The distance of about 35 to 37 μm refers to the vicinity of the reproducing element 12. The distance of about 31 μm refers to the vicinity of the main magnetic pole layer 33. The distance of about 29 to 31 μm refers to the return yoke layer 40. The amount of projection is a value simulated while one end face 1a of the slider 1 opposing the recording medium M is taken as reference surface 0 at an ambient temperature of 25° C. when the heater is not energized.

The above-mentioned graph shows it possible to project the vicinity of the reproducing element 12 more when the thickness of the second upper shield layer 14b is 0.4 to 1.2 μm (25% to 75% of the thickness of the upper shield layer 14) than in the single compositions of Ref (0 μm) and 1.6 μm. The reproducing element 12 can be projected to the maximum when the thickness of the second upper shield layer 14b is 0.8 μm (about 50% of the thickness of the upper shield layer 14).

The foregoing results of simulations show that, by setting the thickness of the second upper shield layer 14b to about 0.4 to 1.2 μm, i.e., about 25% to about 75% of the thickness of the upper shield layer 14, the thin-film magnetic head of the second embodiment projects the reproducing element 12 more than the upper and lower shield layers, thereby improving the recording and reproducing characteristics, and can keep the improved recording and reproducing characteristics regardless of changes in temperature.

Further, since the reproducing element 12 projects more than the main magnetic pole layer 33 and return yoke layer 40, the possibility of the main magnetic pole layer 33 and return yoke layer 40 coming into contact with the recording medium by projection is lowered in the second embodiment.

For confirming the foregoing results of simulations, amounts of projection were measured in samples with Fe—Ni alloys having different Fe compositions. Used as samples to be measured were those in which an insulating layer made of $Al_2O_3$ was formed on an upper shield layer, an Fe—Ni alloy as a film to evaluate was formed thereon by 3 μm, an overcoat made of $Al_2O_3$ was formed thereon, and the resulting product was cut into an actual slider size in order to make it closer to the state of a real product. While the room temperature, which was ambient temperature, was raised to 50° C. or 70° C., amounts of projection were actually measured while one end face 1a of the slider 1 opposing the recording medium M was taken as reference surface 0 at an ambient temperature of 25° C. when the heater was not energized.

Figure 5:
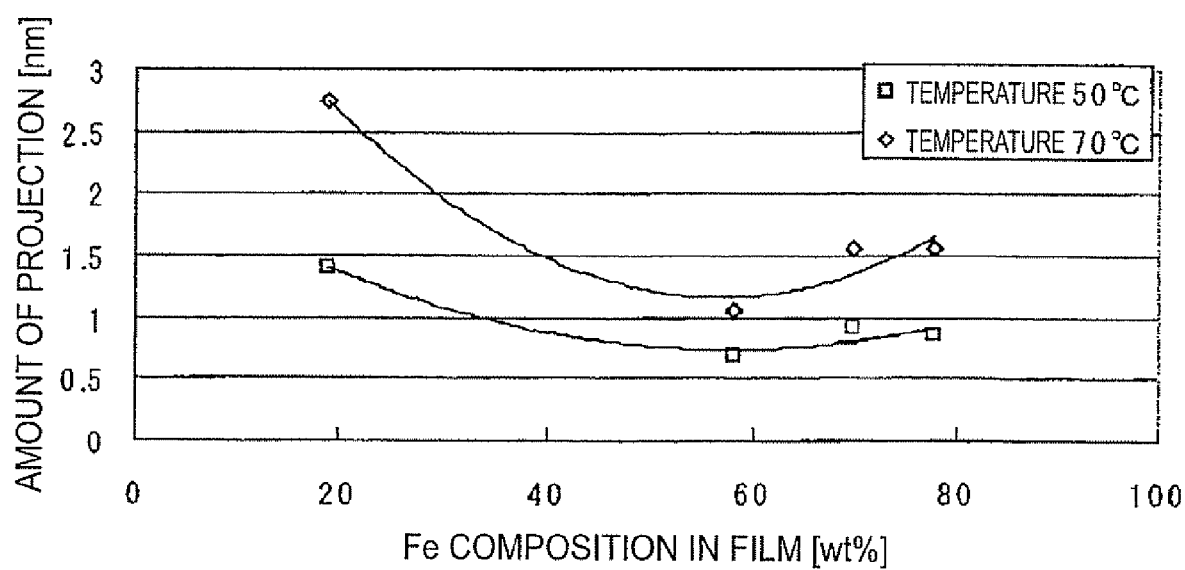
FIG. 5 is a graph showing relationships between the Fe composition in Fe—Ni alloys and the amount of projection.

FIG. 5 shows the actually measured amounts of projection. According to FIG. 5, the amount of projection decreases when the Fe composition in the Fe—Ni film is about 58 wt %. The amount of projection is found to be greater when the Fe composition is 70 to 78 wt % or near 19 wt % than in the evaluated film where the Fe composition is about 58 wt %.

What is claimed is:

1. A thin-film magnetic head comprising a reproducing element formed on an undercoat film on a head substrate surface, a recording element formed on the upper side of the reproducing element, and a heater formed on the upper or lower side of the reproducing element, the heater generating heat upon energization so as to project at least the reproducing element by thermal expansion toward a recording medium;

wherein a shield layer is formed between the reproducing element and the heater by a plurality of layers including at least first and second shield layers;

wherein, in the first and second shield layers, the second shield layer located closer to the heater is formed by a material having a coefficient of thermal expansion smaller than that of the first shield layer located closer to the reproducing element; and wherein the first shield layer is formed by Fe—Ni containing about 19 wt % of Fe, while the second shield layer is formed by Fe—Ni containing about 58 wt % of Fe.

2. A thin-film magnetic head according to claim 1, wherein the recording element has a main magnetic pole layer and a return yoke layer, the magnetic pole layer and the return yoke layer being exposed at a surface opposing the recording medium while holding a magnetic gap layer therebetween, the return yoke layer being formed by a material having a coefficient of thermal expansion smaller than that of the first shield layer.

3. A thin-film magnetic head according to claim 1, wherein the second shield layer has a thickness of about 25% to about 75% that of the shield layer.

* * * * *